(12) United States Patent
Schwagerl

(10) Patent No.: US 9,901,990 B2
(45) Date of Patent: Feb. 27, 2018

(54) DRILLING TOOL

(75) Inventor: Jurgen Schwagerl, Vohenstrauss (DE)

(73) Assignee: KENNAMETAL INC., Latrobe, PA (US)

( * ) Notice: Subject to any disclaimer, the term of this patent is extended or adjusted under 35 U.S.C. 154(b) by 553 days.

(21) Appl. No.: 13/576,482

(22) PCT Filed: Feb. 4, 2011

(86) PCT No.: PCT/EP2011/000518
§ 371 (c)(1),
(2), (4) Date: Oct. 23, 2012

(87) PCT Pub. No.: WO2011/095344
PCT Pub. Date: Aug. 11, 2011

(65) Prior Publication Data
US 2013/0045058 A1    Feb. 21, 2013

(30) Foreign Application Priority Data

Feb. 4, 2010    (DE) .................... 10 2010 006 797

(51) Int. Cl.
*B23B 51/02*    (2006.01)
*B24B 3/32*    (2006.01)
*B24B 19/04*    (2006.01)

(52) U.S. Cl.
CPC .......... *B23B 51/02* (2013.01); *B24B 3/32* (2013.01); *B24B 19/04* (2013.01); *B23B 2251/18* (2013.01); *Y10T 408/9095* (2015.01); *Y10T 408/9097* (2015.01)

(58) Field of Classification Search
CPC ..................................... B23B 51/02

USPC .... 408/230, 227, 229; 76/451, 108.6, 108.1, 76/115; 451/48
See application file for complete search history.

(56) References Cited

U.S. PATENT DOCUMENTS

| 465,392 A | 12/1891 | Shippee |
| 500,213 A | 6/1893 | Richards |
| 1,467,491 A * | 9/1923 | Oliver .......................... 408/230 |
| 2,457,132 A | 12/1948 | Delaney |
| 2,936,658 A * | 5/1960 | Riley ............................ 408/230 |
| 3,806,270 A | 4/1974 | Tanner et al. |
| 4,561,813 A * | 12/1985 | Schneider .............. B23B 51/02 |
| | | 408/228 |
| 4,594,034 A | 6/1986 | Maier |

(Continued)

FOREIGN PATENT DOCUMENTS

| CN | 1053903 A | 8/1991 |
| CN | 2231586 Y | 7/1996 |

(Continued)

OTHER PUBLICATIONS

Machine translation, Japan patent publication JP 64-011703, "Twist Drill", Hosono et al., Jan. 1989.*

(Continued)

*Primary Examiner* — Daniel Howell
*Assistant Examiner* — Chwen-Wei Su
(74) *Attorney, Agent, or Firm* — Ian K. Samways

(57) ABSTRACT

A drilling tool includes at least two chip flutes and a chisel edge with a thinned region. The thinned region merges continuously into the chip flutes in such a way that the thinned region forms the end of the respective chip flute in the region of the chisel edge.

14 Claims, 13 Drawing Sheets

(56) References Cited

U.S. PATENT DOCUMENTS

| | | | |
|---|---|---|---|
| 4,602,900 A | 7/1986 | Arpaio, Jr. et al. | |
| 4,605,347 A | 8/1986 | Jodock et al. | |
| 4,756,650 A * | 7/1988 | Wakihira et al. | 408/230 |
| 4,826,368 A * | 5/1989 | Tikal et al. | 408/225 |
| 4,913,603 A | 4/1990 | Friedli et al. | |
| 5,297,456 A | 3/1994 | Nishimura | |
| 5,486,075 A * | 1/1996 | Nakamura | B23B 51/02 408/224 |
| 5,931,615 A * | 8/1999 | Wiker | 408/230 |
| 5,951,214 A | 9/1999 | Rothballer et al. | |
| 6,045,301 A | 4/2000 | Kammermeier | |
| 6,116,825 A | 9/2000 | Kammermeier | |
| 6,210,083 B1 | 4/2001 | Kammermeier | |
| 6,837,781 B2 | 1/2005 | Hishiki | |
| 6,988,859 B2 * | 1/2006 | Borschert et al. | 408/230 |
| 7,252,461 B2 | 8/2007 | Karonen | |
| 7,275,856 B2 | 10/2007 | Koetas et al. | |
| 7,396,497 B2 | 7/2008 | Koetas et al. | |
| 7,435,364 B2 | 10/2008 | James et al. | |
| 7,530,772 B2 * | 5/2009 | Reinhardt | B23B 51/02 408/227 |
| 2002/0159849 A1 | 10/2002 | Longden et al. | |
| 2003/0002941 A1 | 1/2003 | Borschert et al. | |
| 2003/0053874 A1 | 3/2003 | Moore | |
| 2003/0175086 A1 | 9/2003 | Muhlfriedel et al. | |
| 2005/0135887 A1 | 6/2005 | Borschert et al. | |
| 2005/0249562 A1 | 11/2005 | Frejd | |
| 2006/0228439 A1 | 10/2006 | James et al. | |
| 2006/0269372 A1 * | 11/2006 | Goshima | 408/230 |
| 2007/0071559 A1 | 3/2007 | Koskinen | |
| 2007/0237594 A1 | 10/2007 | Lang et al. | |
| 2008/0199268 A1 * | 8/2008 | Krenzer et al. | 408/230 |
| 2008/0232912 A1 | 9/2008 | Bhagath | |
| 2009/0016832 A1 | 1/2009 | Onose et al. | |
| 2009/0155004 A1 | 6/2009 | Jansson | |
| 2010/0260567 A1 | 10/2010 | Kauper | |
| 2011/0188956 A1 | 8/2011 | Mueller et al. | |
| 2012/0009034 A1 | 1/2012 | Mack et al. | |
| 2013/0028677 A1 | 1/2013 | Schwaegert et al. | |
| 2013/0045058 A1 | 2/2013 | Schwagerl | |

FOREIGN PATENT DOCUMENTS

| | | | |
|---|---|---|---|
| CN | 1443619 A | 9/2003 | |
| CN | 1618557 A | 5/2005 | |
| CN | 1910003 A | 2/2007 | |
| CN | 2920492 Y | 7/2007 | |
| CN | 201147858 Y | 11/2008 | |
| DE | 9320448 U1 | 7/1994 | |
| DE | 4403300 A1 | 8/1995 | |
| DE | 198 07 609 A1 | 6/1999 | |
| DE | 202005020829 U1 | 11/2006 | |
| DE | 102006062429 A1 | 7/2008 | |
| DE | 102007050050 A1 | 4/2009 | |
| DE | 102008045326 A1 | 2/2010 | |
| DE | 102008049509 A1 | 3/2010 | |
| DE | 102010006796 B4 | 12/2011 | |
| EP | 502541 A1 | 9/1992 | |
| EP | 672492 A1 | 9/1995 | |
| EP | 1230058 B1 | 10/2003 | |
| EP | 1 294 515 B1 | 4/2005 | |
| FR | 2885836 A1 | 11/2006 | |
| GB | 161007 A * | 4/1921 | B23B 51/02 |
| JP | 51087794 U | 7/1976 | |
| JP | 57107716 A | 7/1982 | |
| JP | 62068213 A * | 3/1987 | |
| JP | 63093509 A * | 4/1988 | |
| JP | 63306811 A | 12/1988 | |
| JP | 01011703 A * | 1/1989 | |
| JP | 08300214 A | 11/1996 | |
| JP | 09207007 A | 8/1997 | |
| JP | 2905555 B2 | 6/1999 | |
| JP | 11179611 A | 7/1999 | |
| JP | 2000084720 A | 3/2000 | |
| JP | 2004001219 A | 1/2004 | |
| JP | 2004082248 A | 3/2004 | |
| JP | 2006150553 A | 6/2006 | |
| JP | 2007144526 A | 6/2007 | |
| JP | 2009056534 A | 3/2009 | |
| SU | 1060342 A | 12/1983 | |
| SU | 1238905 A1 * | 6/1986 | |
| SU | 1808507 A1 * | 4/1993 | |
| WO | 9635538 A1 | 11/1996 | |
| WO | 01/36134 A1 | 5/2001 | |
| WO | WO 02066188 A1 * | 8/2002 | B23B 51/02 |

OTHER PUBLICATIONS

Machine translation, German patent document, DE19807609A1, "Twist drill for drilling holes", Diethart et al., Jun. 1999.*
Mar. 11, 2014.
Office Action dated May 9, 2014 with Search Report.
Preliminary Search Report dated Jun. 20, 2014 with Written Opinion.
USPTO, "Office Action for U.S. Appl. No. 13/576,858", dated Feb. 11, 2015, 34 pp.
French Patent Office, "Preliminary Search Report for application FR 11 50873", dated Mar. 20, 2015, 7 pp.
May 6, 2015 Office action (2 months) 102741014A.
Aug. 11, 2015 Final Office Action US 2013-0028677 A1.
Sep. 10, 2015 Office action (3 months) 3 US 2013-0028677 A1.
Mar. 31, 2015 Search report 2955793.
Nov. 17, 2015—Non-Final_Office_Action-13576858.
Feb. 6, 2017 First office action.
Aug. 8, 2017 Second Office Action.

* cited by examiner

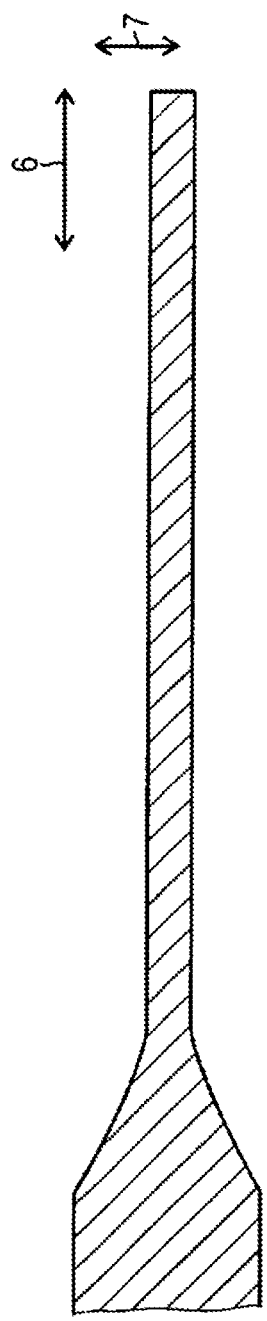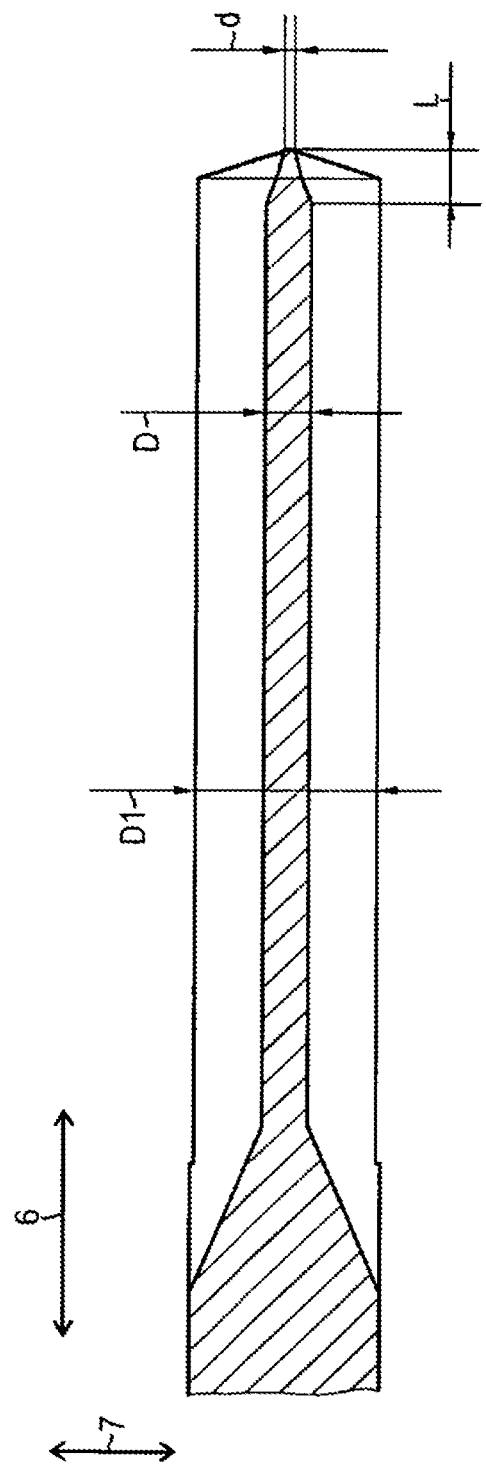

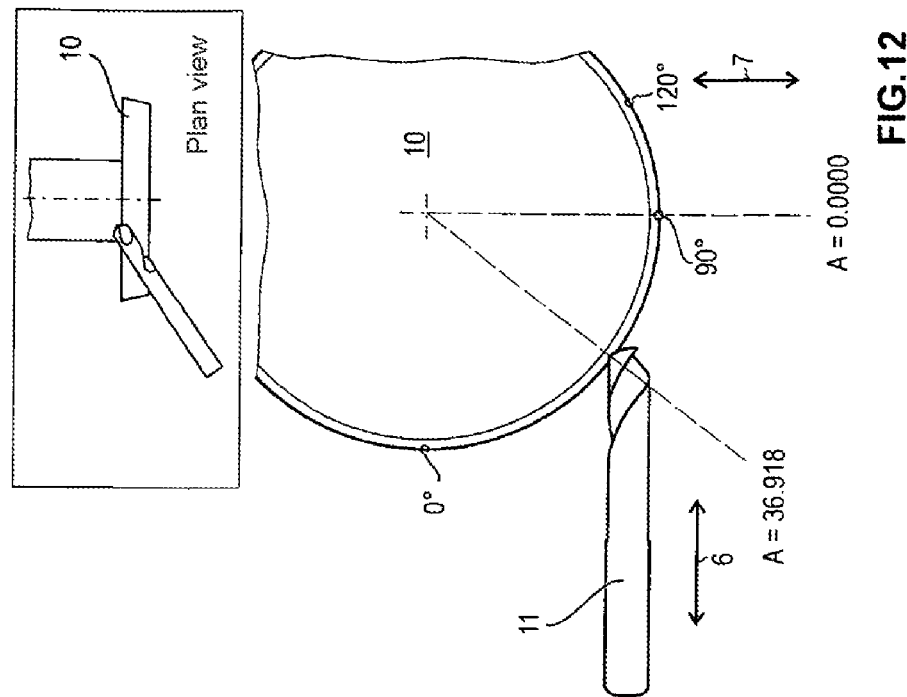
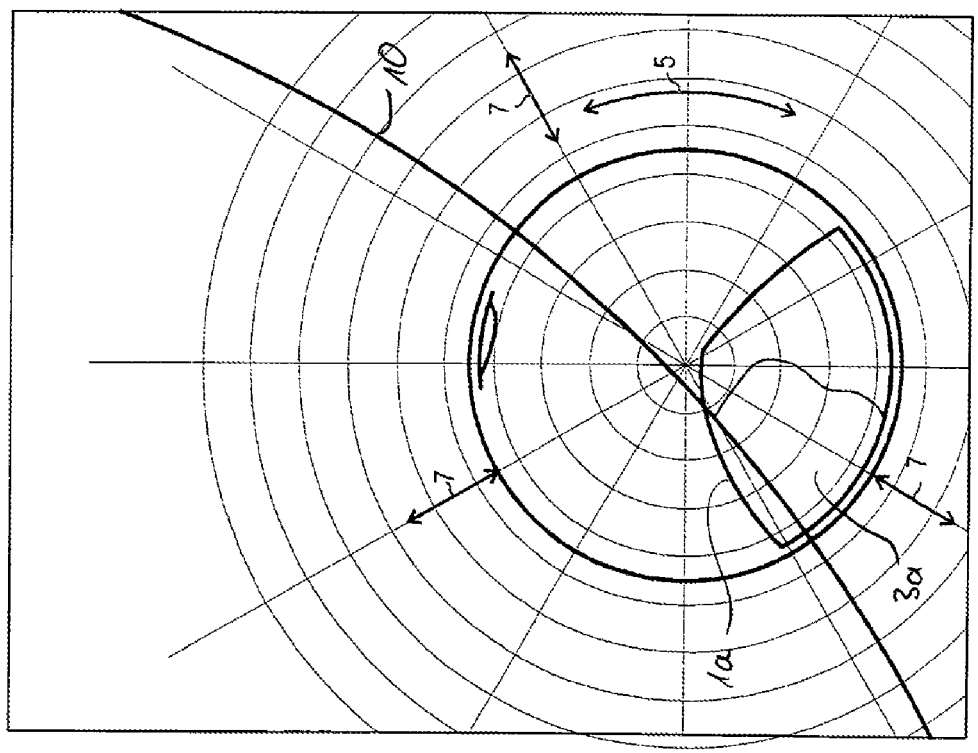
FIG.12

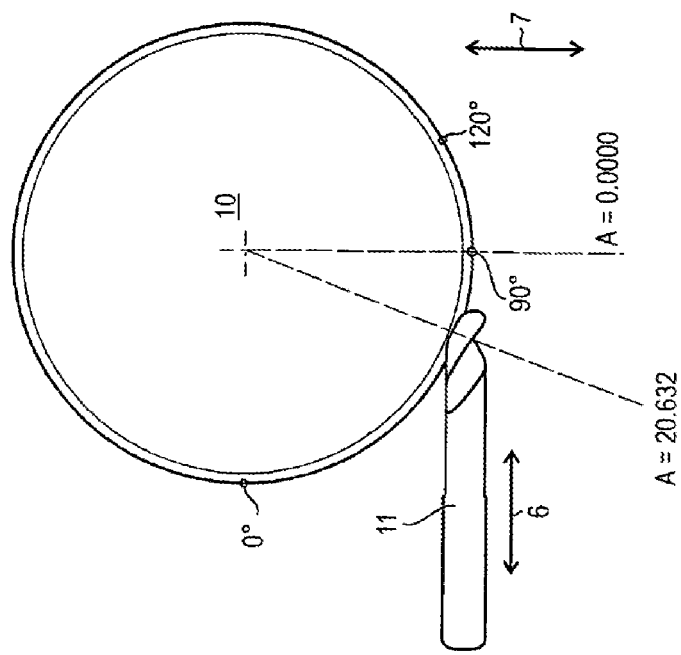
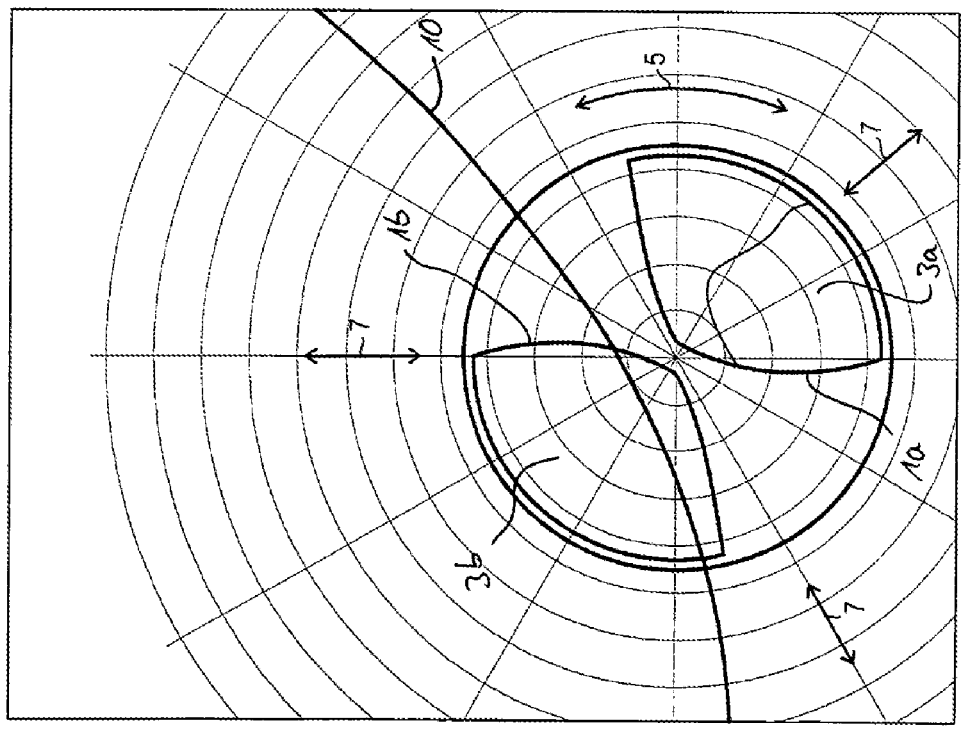
FIG.13

DRILLING TOOL

BACKGROUND OF THE INVENTION

The invention relates to a drilling tool in accordance with the preamble of claim 1. A drilling tool of this kind is known, for example, from EP 1 230 058, which is likewise attributable to the applicant. In the region of the drill point of a drilling tool of this kind, two or more major cutting edges are connected to one another by a chisel edge. The practice of reducing the size of this chisel edge by applying a "thinned region" is known in the area of machining technology in general and from the abovementioned EP 1 230 058, in particular. Since the cutting rate is equal to zero in the region of the chisel edge, the mechanical load on the drill point of the drilling tool is significantly reduced by such a reduction in the size of the chisel edge.

In the production of drilling tools, the thinned region of the chisel edge is generally produced in a multi-stage grinding process. In a first grinding operation, the chip flutes and, if appropriate, the minor cutting edges provided at the boundary of the chip flutes are ground into the drilling tool blank. In a second process step, the major cutting edges, the chisel edge and the flanks adjoining the major cutting edges are ground. In a third grinding operation, the chisel edge is then thinned. For each grinding operation, the grinding tool, which is generally formed by a rotating grinding disk, is in each case applied again to the drill blank to be ground in order to grind the major cutting edges and the chisel edge, to grind the thinned region and to grind the spiral flutes. Each new application of the grinding tool to the drill blank entails the formation of discontinuities during grinding, thereby giving rise to unwanted ridges on the finished drilling tool.

These ridges must either be smoothed and removed afterwards by complex and costly finish machining processes. If such finish machining is omitted, the accuracy of running of the drilling tool may be impaired, and the mechanical loads acting on the drilling tool during the drilling operation increase, and this inevitably leads to a reduction in the life of the drilling tool.

EP 1 230 058 has disclosed a process for grinding a drill point which prevents the formation of ridges in the region of the drill point of the drilling tool disclosed there. The disadvantage with this grinding process is the fact that it is suitable only for the way, shown there, of grinding the drill point in the region of the chisel edge.

Object of the Invention

It is therefore the underlying object of the invention to indicate a drilling tool and a process for producing a drilling tool which is suitable for any way of grinding the drilling tool in the region of the drill point.

Achievement of the Object

This object is achieved in an inventive manner by the combination of features in claim 1 in respect of a drilling tool and of those in claim 5 in respect of a production process for a drilling tool. The advantageous and modified embodiments described in addition concern developments of the invention which are both expedient and inventive per se.

The invention is based on the fundamental consideration that the thinning of the chisel edge and the grinding of the chip flutes can be performed in a single grinding operation. To achieve this, the grinding tool also makes contact with the drill blank only once, thereby eliminating from the outset the unwanted formation of ridges. The thinned region in the region of the chisel edge merges continuously and without ridges into the chip flute. The thinned region is thus, as it were, part of the chip flute and thus forms the end of the chip flute in the region of the major cutting edges, i.e. the end of the chip flute remote from the clamping shank of the drilling tool. The chip flute walls bounding the chip flute therefore extend continuously without ridges as far as the end of the drill, i.e. as far as the respective major cutting edge, as far as the chisel edge and as far as the "major flank". At the same time, the thinned region means that the "core diameter" tapers towards the chisel edge. When viewed in cross section, the chip flute wall is thus uniform, i.e. without kinks.

In a preferred development of the drilling tool, the chip flutes are helical, and therefore the thinned region is likewise of helical design. In particular, the thinned region adjoins the chisel edge in a helical shape. The chip flute wall adjoining the chisel edge in the axial direction therefore has a twist starting from the chisel edge.

The core diameter is preferably reduced steadily to a reduced core diameter (d) at the chisel edge by the thinned region, i.e. during grinding the path traced leads back successively in a radial direction from the chisel edge to the grinding disk, and therefore the core diameter widens successively and no ridges are formed in the chip flute wall. The term "core diameter" is generally understood to mean the minimum distance between chip flute walls at the center of the drill.

The reduced core diameter corresponds, in particular, to 0.01 to 0.2 times an outside circumference diameter of the drilling tool, i.e. during grinding the grinding disk is moved up correspondingly close to the center of the drill in the single-stage grinding process.

It is expedient if the thinned region has a longitudinal extent in the longitudinal direction of the drill which corresponds to 0.1 to 1.5 times an outside circumference diameter of the drilling tool. During the grinding process, the grinding disk is therefore guided continuously over this length from the reduced core diameter to the normal core diameter adjoining the thinned region.

In a preferred development, a step is formed at the transition from a major flank to the chip flute. This means, in particular, that the major flank ends at a ridge extending in a radial direction, which is then adjoined by the chip flute wall extending in an axial direction.

The major cutting edge preferably extends outwards in a curve or an arc in a radial direction from the chisel edge. As an alternative, a rectilinear profile is provided.

To achieve the object in accordance with the invention and to obtain the drilling tool, a three-stage production process is provided. In a first process step, a rotating grinding disk feeds into the drilling tool blank from the end of the cutting edge in the region of the drill point. Relative to the drilling tool blank, the grinding disk is preferably set here at the lead angle of the chip flute to be ground. To cut a protective chamfer, the grinding disk is then preferably simply tilted slightly during the grinding process. As soon as the grinding disk is in engagement with the drilling tool blank, the grinding disk is moved in a radial direction of the tool blank in the second process step in order to grind the thinned region and then makes a continuous transition to the third process step. In the third process step, the grinding disk moves in an axial direction along the drilling tool blank in order to grind the chip flute continuously adjoining the thinned region. For the transition from the thinned region with the reduced core diameter to the chip flute, the grinding disk is moved back again somewhat in a radial direction in a movement superimposed on the axial movement. In particular, the radial movement is superimposed on the axial movement from the beginning during the grinding of the thinned region.

It is of particular significance here that the grinding of the thinned region is followed by the grinding of the chip flute in the same grinding operation without withdrawing the grinding disk. During this process, the chip flute is ground continuously from the chisel edge to the shank end of the chip flute.

In another embodiment, the drill blank performs a predefined rotary motion during the second process step or during the third process step or during the second and the third process step. With the aid of this rotary motion, a helical chip flute is obtained and the twist of this helical chip flute or spiral flute is determined. Thus, the process is suitable for producing both drilling tools with straight flutes and drilling tools with spiral flutes. The grinding of the thinned region is therefore, in particular, a superimposed motion involving a radial, an axial and a rotary component.

According to a preferred development, there is provision in a further process step to provide the drilling tool blank preground in this way with any desired end grinding. In a preferred embodiment, the grinding of the chip flutes and of the thinned region is therefore performed first of all in a continuous, seamless grinding process before the end geometry of the drill is then ground. As an alternative, it is also possible for the end geometry to be ground beforehand.

One advantage of the invention is the fact that any number of cutting edge versions can be achieved with a single drilling tool blank, i.e. with a single basic part. This has a positive effect in terms of low stocking levels of drilling tool blanks, and this means that the amount of resources tied up is low. Moreover, with the invention it is possible to match the drilling tool in an optimum manner to any cutting application by means of appropriate grinding of the drill point. The invention is therefore also particularly suitable for producing small batches or small lot sizes, right down to a lot size of 1. Finally, the invention also makes it possible to incorporate refinements in the grinding of the cutting edges of the drill immediately into a running production process. In an expedient embodiment, provision is therefore also made, in particular, to produce a large number of drilling tool blanks initially, in particular to keep these in storage and only later to carry out end grinding. Another advantage of the invention consists in the possibility of configuring the thinned region itself in a helical or twisted shape. It is also possible with the invention to provide a straight chisel edge initially, which is adjoined by a helical or twisted thinned region.

It is also possible to produce special drilling tools, e.g. drilling tools with core tapering in an axial direction, with the production process according to the invention. The production process claimed is particularly suitable for producing drilling tools with 5-axis machine tools.

DESCRIPTION OF THE FIGURES

FIG. 4 shows the side view of the profile of the core diameter of a drilling tool in accordance with the prior art, FIG. 5 shows the side view of the core profile of a drilling tool according to the invention;

FIG. 12 shows the position of the grinding disk of a grinding tool at the beginning of the grinding process according to the invention as it grinds a curved major cutting edge onto a drilling tool, in a plan view of the drill point on the left-hand side and in side view on the right-hand side;

FIG. 13 shows the views from FIG. 12 with the position of the grinding disk at the end of the thinned region of the curved major cutting edge of the drilling tool;

DESCRIPTION OF THE ILLUSTRATIVE EMBODIMENT

Figure 1:
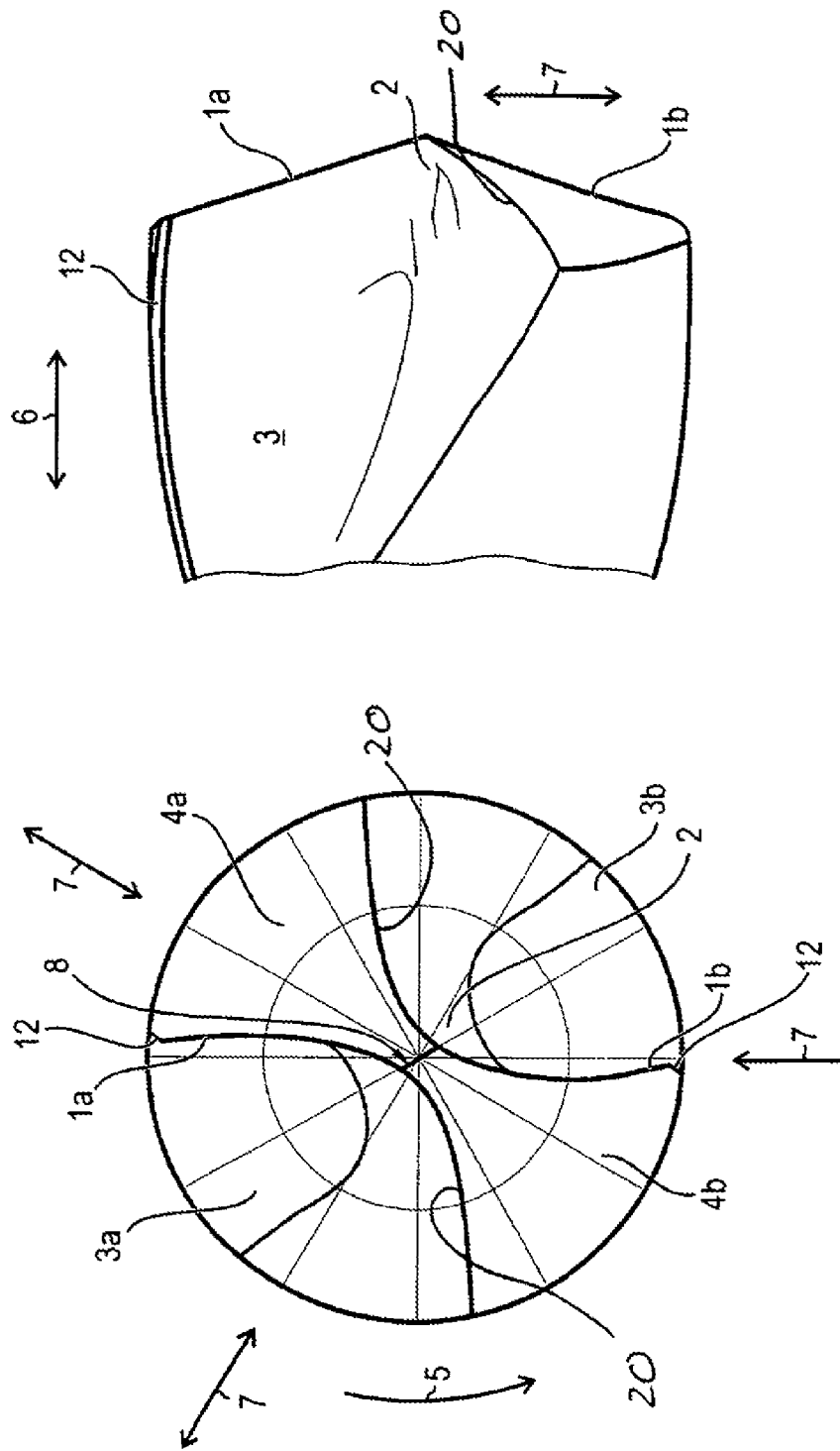
FIG. 1 shows an illustration of the point of a drilling tool according to the invention, with the left-hand half of FIG. 1 showing a plan view of the drill point in a longitudinal direction of the drilling tool and the right-hand half showing a corresponding side view of the drill point.

The drilling tool illustrated in FIG. 1 has the two major cutting edges 1a and 1b with a protective chamfer 12, and the chisel edge 8, which connects the major cutting edges 1a, 1b and has the thinned region 2. The continuous transition from the thinned region 2 into the corresponding chip flute 3a can be seen in the right-hand half of FIG. 1. From the left-hand part of FIG. 1 it can be seen that, corresponding to the two major cutting edges 1a, 1b, two chip flutes 3a and 3b are also formed on the drilling tool according to the invention. Here, the term "continuous transition" should be understood to mean that the (chip flute) wall region which directly adjoins the end of the drill (end face), in particular the chisel edge, and extends in an axial direction has a smooth surface without ridges and kinks. Adjoining the major cutting edges 1a and 1b there are respective major flanks 4a and 4b. These end at a step 20 or ridge, which forms the transition to the chip flute 3a, 3b. The direction of rotation 5 of the drilling tool is furthermore indicated by a corresponding arrow in FIG. 1. The longitudinal direction 6 of the drilling tool and the radial direction 7 are also shown in FIG. 1.

Figure 2:
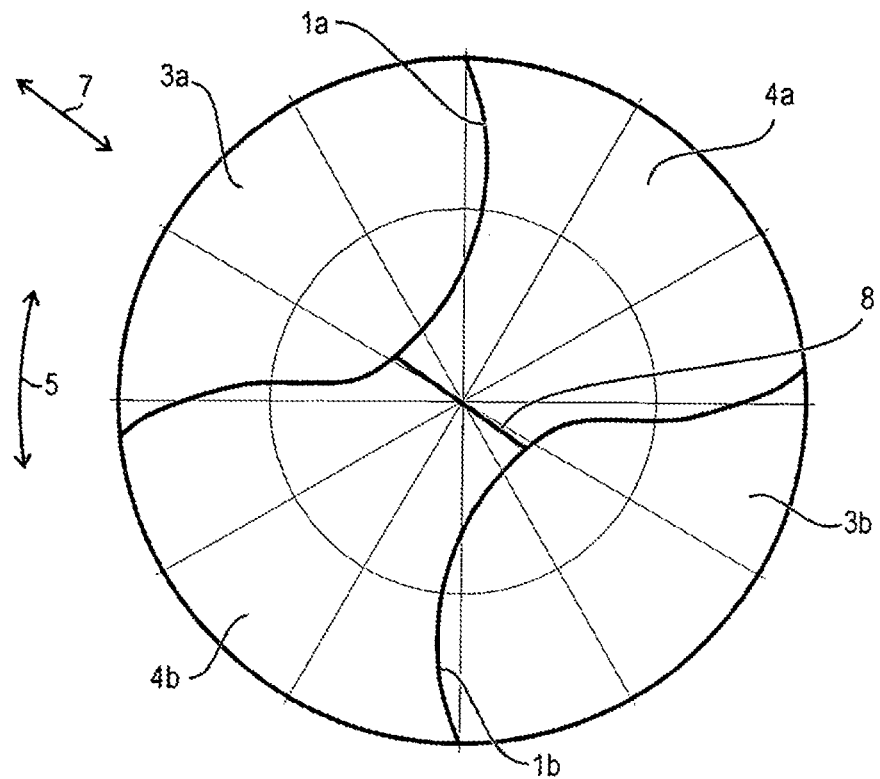
FIG. 2 shows a conventional drilling tool point without thinning in accordance with the prior art.

FIG. 2 likewise shows a plan view of the drilling point of a drilling tool, said plan view corresponding to the left-hand view in FIG. 1, although this is according to the prior art. This prior art drilling tool too has two major cutting edges 1a, 1b, two corresponding major flanks 4a, 4b and two chip flutes 3a, 3b. However, there is no thinned region here. On this prior art tool, the chisel edge 8 connecting the two major cutting edges 1a and 1b obviously has a very much greater width in radial direction 7 than the chisel edge 8 with the thinned region 2 on the subject matter of the invention illustrated in FIG. 1.

Figure 3:
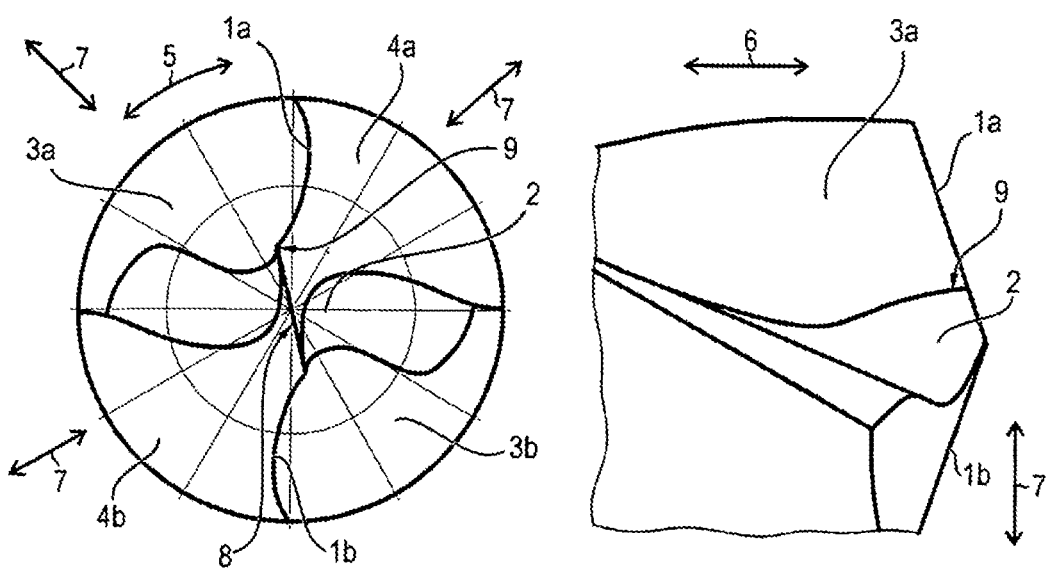
FIG. 3 shows a conventional drill point with thinning in accordance with the prior art, with the left-hand half of FIG. 3 showing the plan view of the drill point with conventional thinning in a longitudinal direction of the drilling tool and the right-hand half showing the side view of this drill point.

Finally, FIG. 3 shows the drill point of a drilling tool with conventional thinning in accordance with the prior art. This known tool too has two major cutting edges 1a, 1b, two chip flutes 3a, 3b and two major flanks 4a, 4b. Also visible, at the transition from the major cutting edges 1a, 1b to the chisel edge 8, are the two ground ridges 9 in the region of the major cutting edges 1a, 1b, which are formed by the repeated application of the grinding disk to the region of the cutting edges during the production of the thinned region 2 on the conventional tool illustrated in FIG. 3.

FIG. 4 shows the profile of the core diameter geometry in side view. In contrast to the profile of the core diameter geometry according to the prior art, which is shown in FIG. 4, the embodiment according to the invention, which is illustrated in FIG. 5, has a thinned region 2 with a twist corresponding to the helical shape of the chip flute 3a, 3b. This thinned region 2 has a longitudinal extent L in a longitudinal direction 6 of the drilling tool. The magnitude of this longitudinal extent corresponds to 0.1 to 1.5 times the outside circumference diameter D1 of the drilling tool. The central diameter d of the thinned region corresponds to 0.01 times to 0.2 times the outside circumference diameter D1. The actual core diameter D of the drilling tool corresponds to 0.1 to 0.6 times the outside circumference diameter D1.

Figure 6:
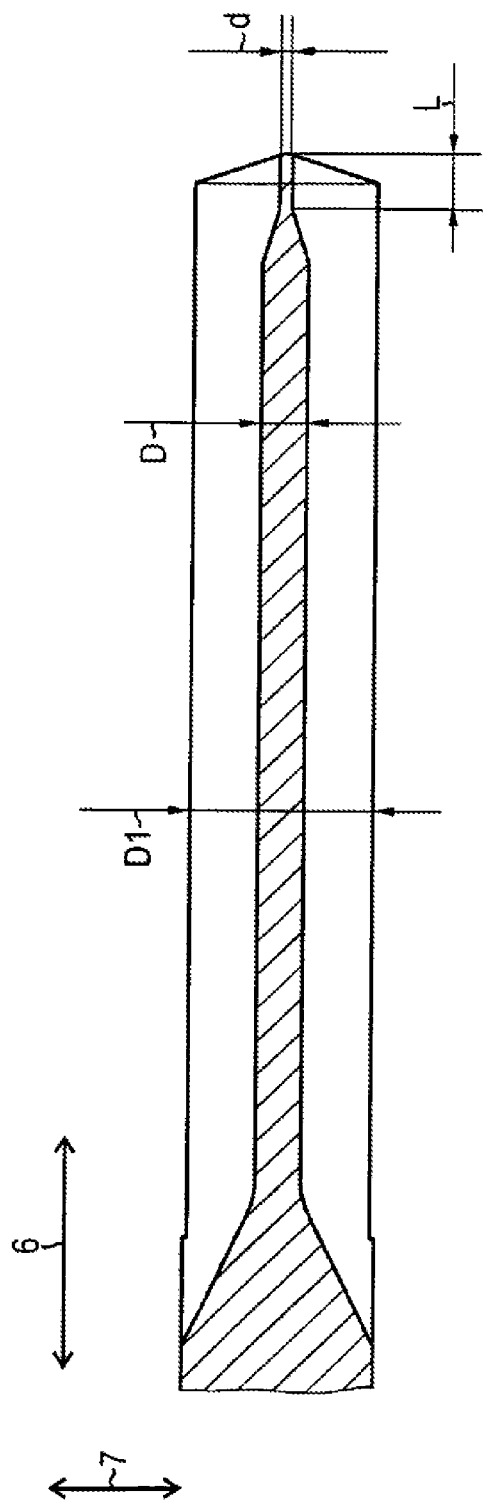
FIG. 6 shows the side view of the core profile of a drilling tool with a constant bevel.

Finally, FIG. 6 shows a core profile with a constant bevel. Here, the longitudinal extent L of the thinned region 2 corresponds to no more than 1.0 times the outside circumference diameter D1. The major cutting edges 1a, 1b of this embodiment can be reground.

Figure 7:
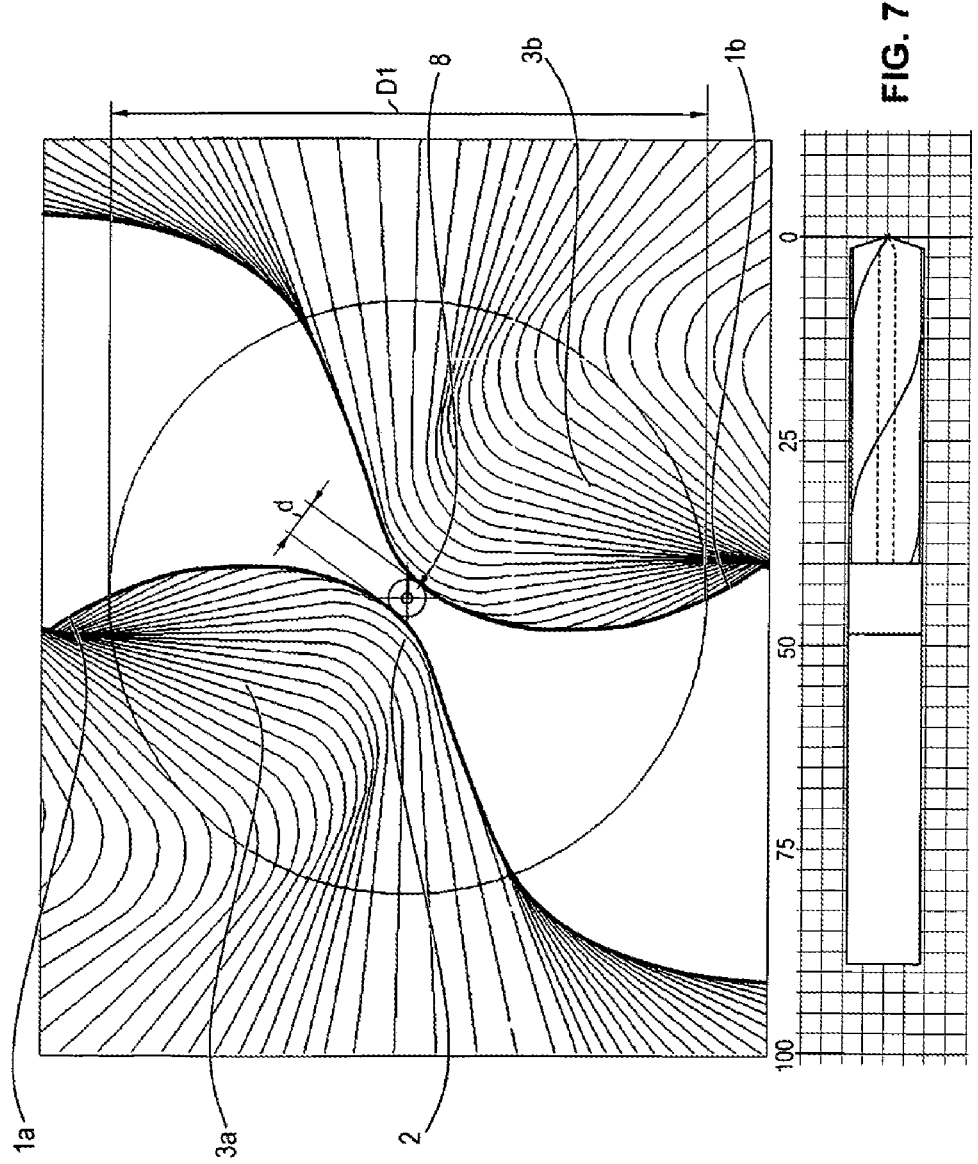
FIGS. 7 to 11 show the core profile of the drilling tool illustrated in FIG. 5 in section at various positions spaced apart in a longitudinal direction of the drilling tool.
Figure 8:
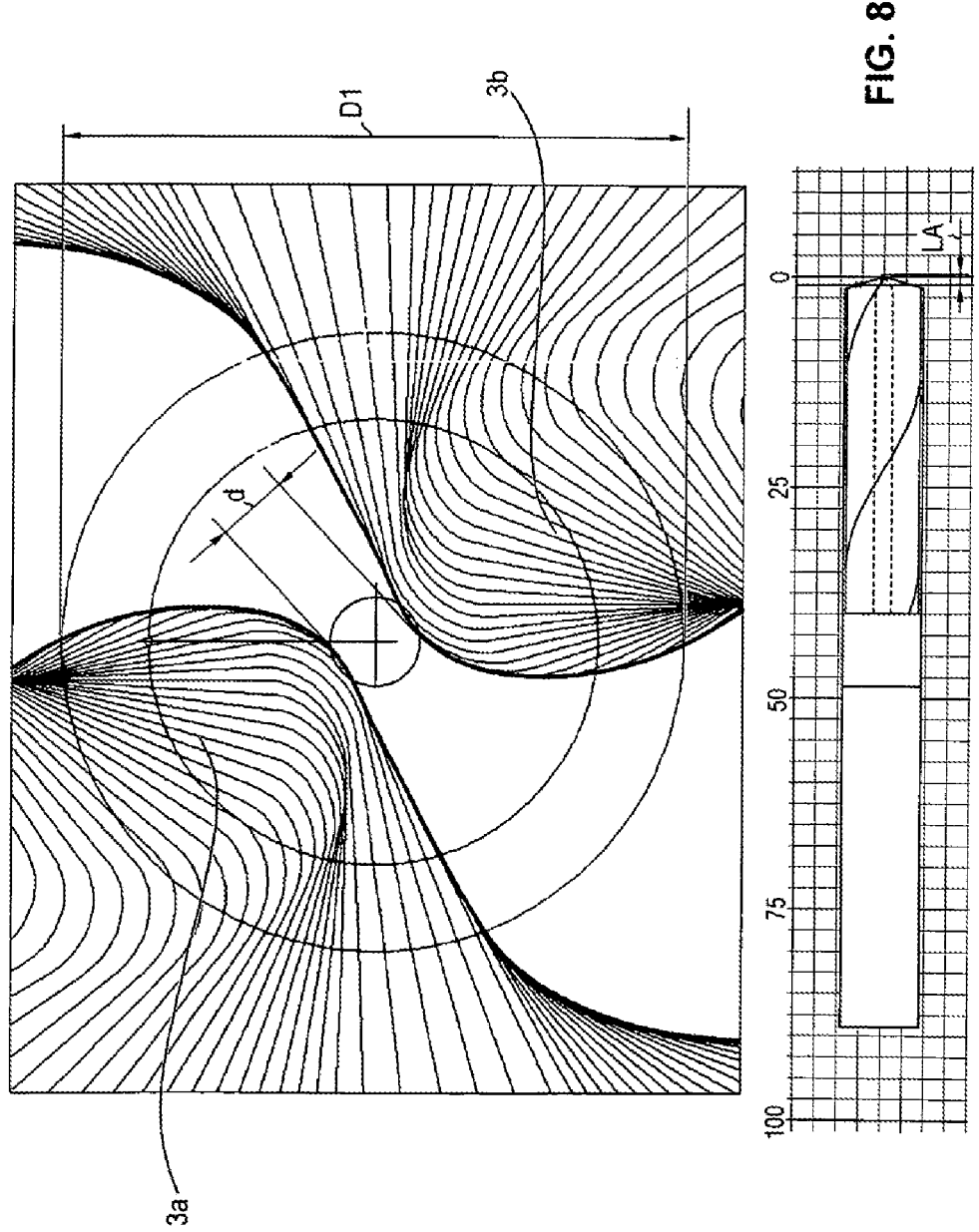
Figure 9:
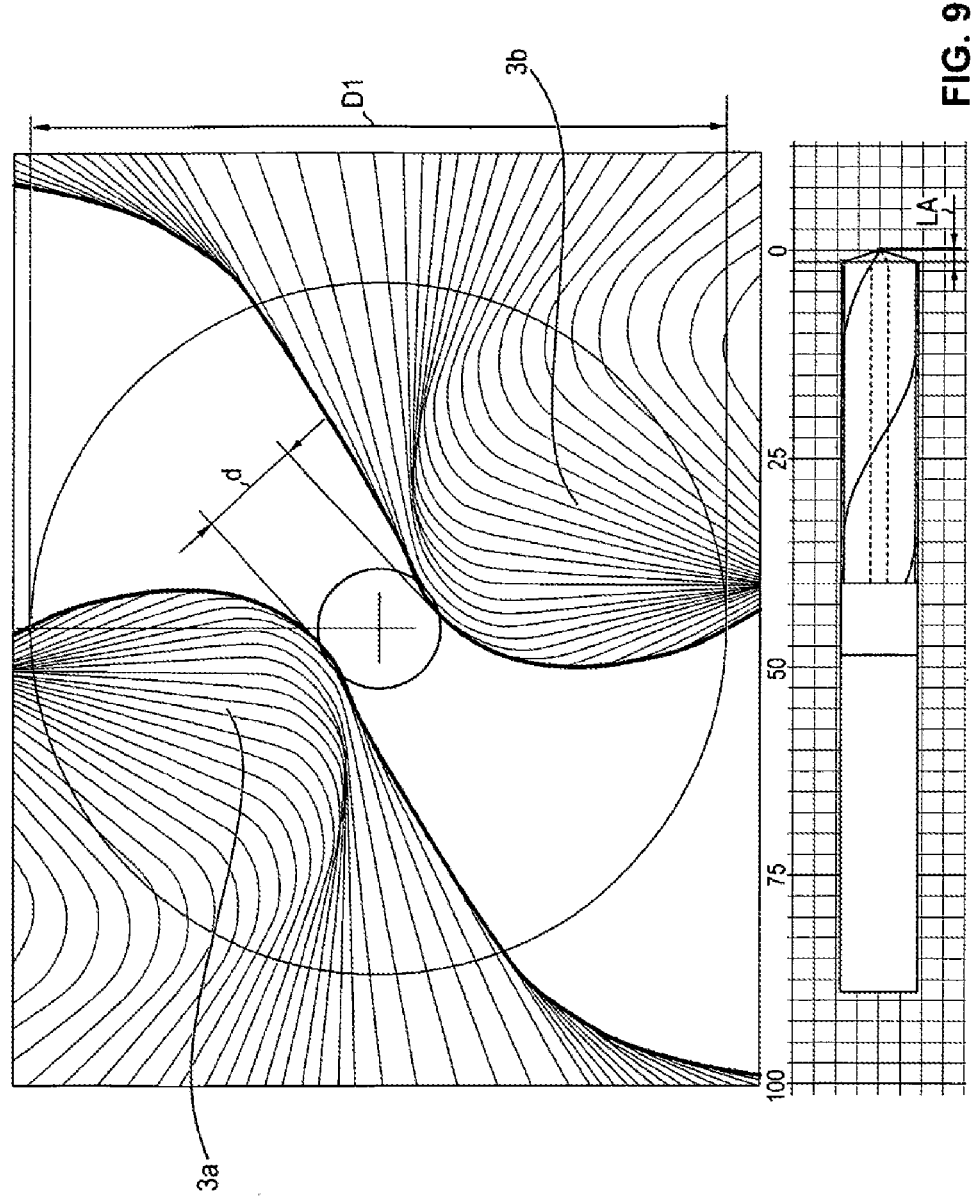
Figure 10:
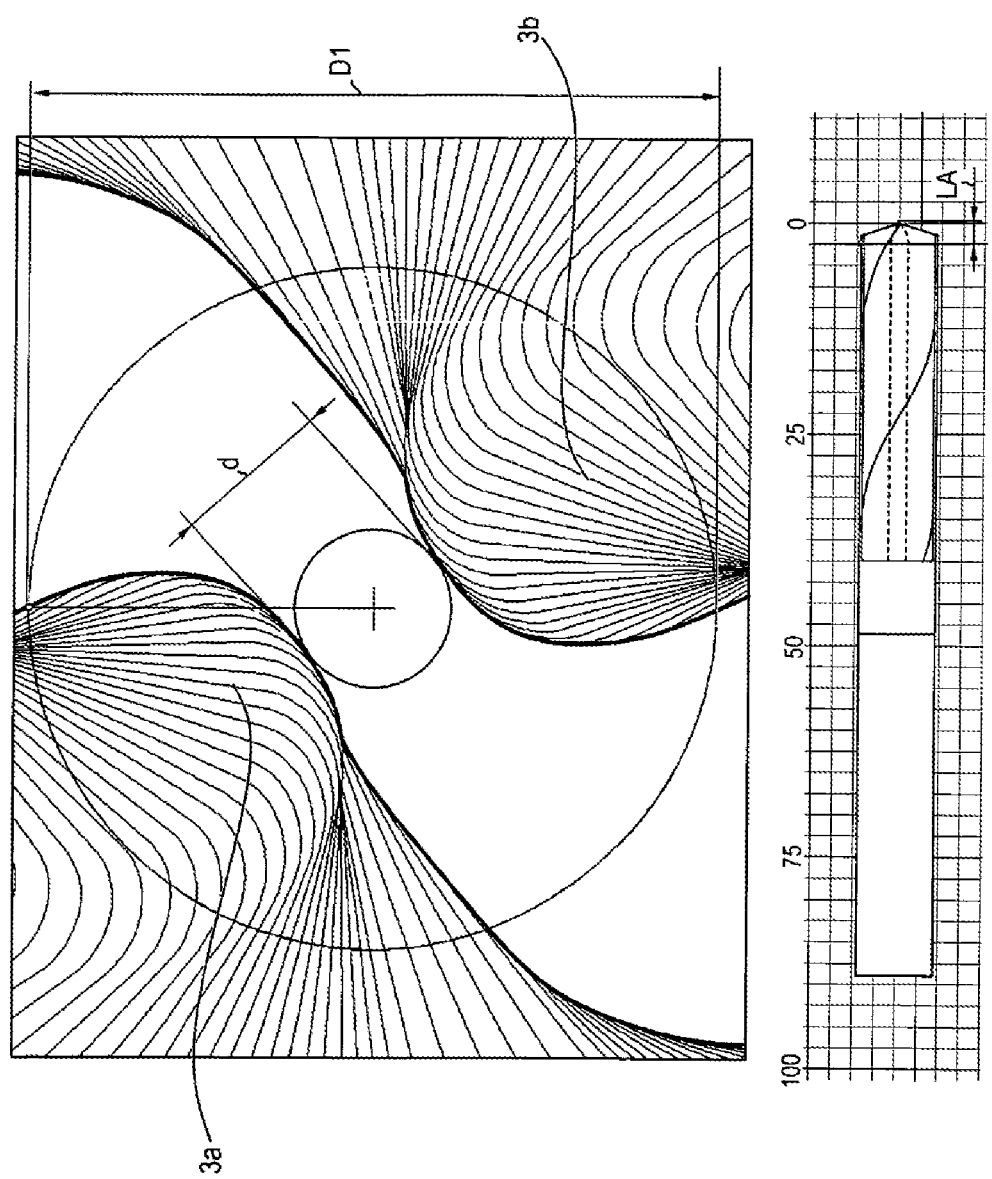
Figure 11:
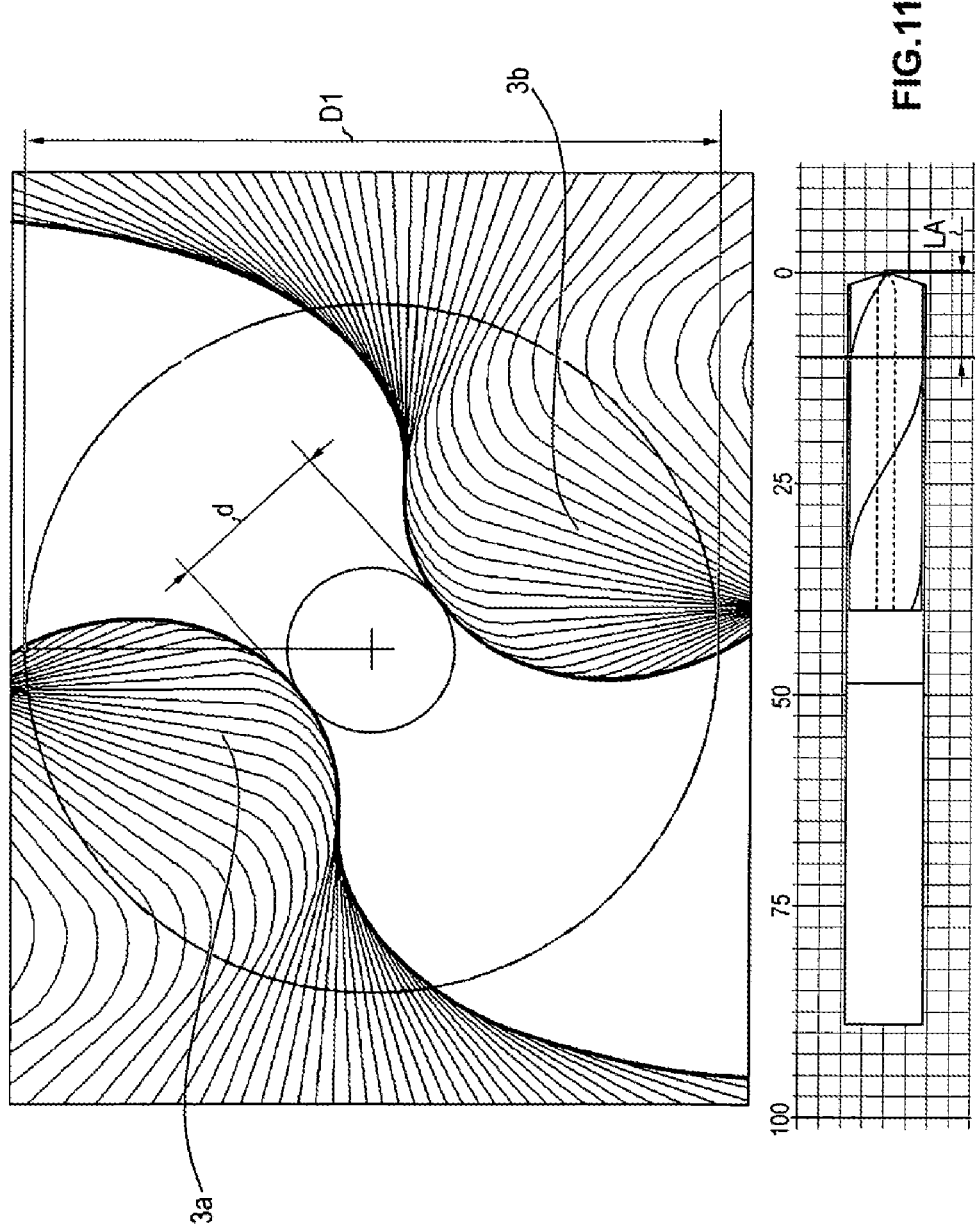

FIG. 7 to FIG. 11 show various "sections" through the drilling tool illustrated in FIG. 5 along the longitudinal direction 6 at different longitudinal distances LA. The figures are computer-generated illustrations in which the peripheral boundary edge is indicated only by the circular profile of the outside circumference diameter D1. FIG. 7 shows the view of the drill point at a longitudinal distance LA=0, and is therefore equivalent to an end view. FIG. 8 shows the cross section of the drilling tool illustrated in FIG. 7 sectioned at the point which corresponds to the longitudinal distance LA from the drill point in the longitudinal direction 6 of the drilling tool corresponding to 0.11 times the outside circumference diameter D1. The central circle depicted indicates the periphery of the drilling tool at the level of this longitudinal distance LA. FIG. 9 shows the same drilling tool sectioned at the point of the longitudinal distance LA from the point of the drilling tool corresponding to 0.2 times the outside circumference diameter D1. FIG. 10 shows the profile at a longitudinal distance LA amounting to half the value of the outside circumference diameter D1 from the drilling point. Finally, FIG. 11 shows through the drilling tool at a longitudinal distance LA corresponding to 1.5 times the outside circumference diameter D1.

From a comparison of FIGS. 7 to 9, on the one hand, the increase in the core diameter d is very clearly visible. On the other hand, the helical profile of the chip flute wall and hence also of the thinned region can also be seen. The profile of the chip flute wall in the section plane is represented by the thick black lines.

Figure 14:
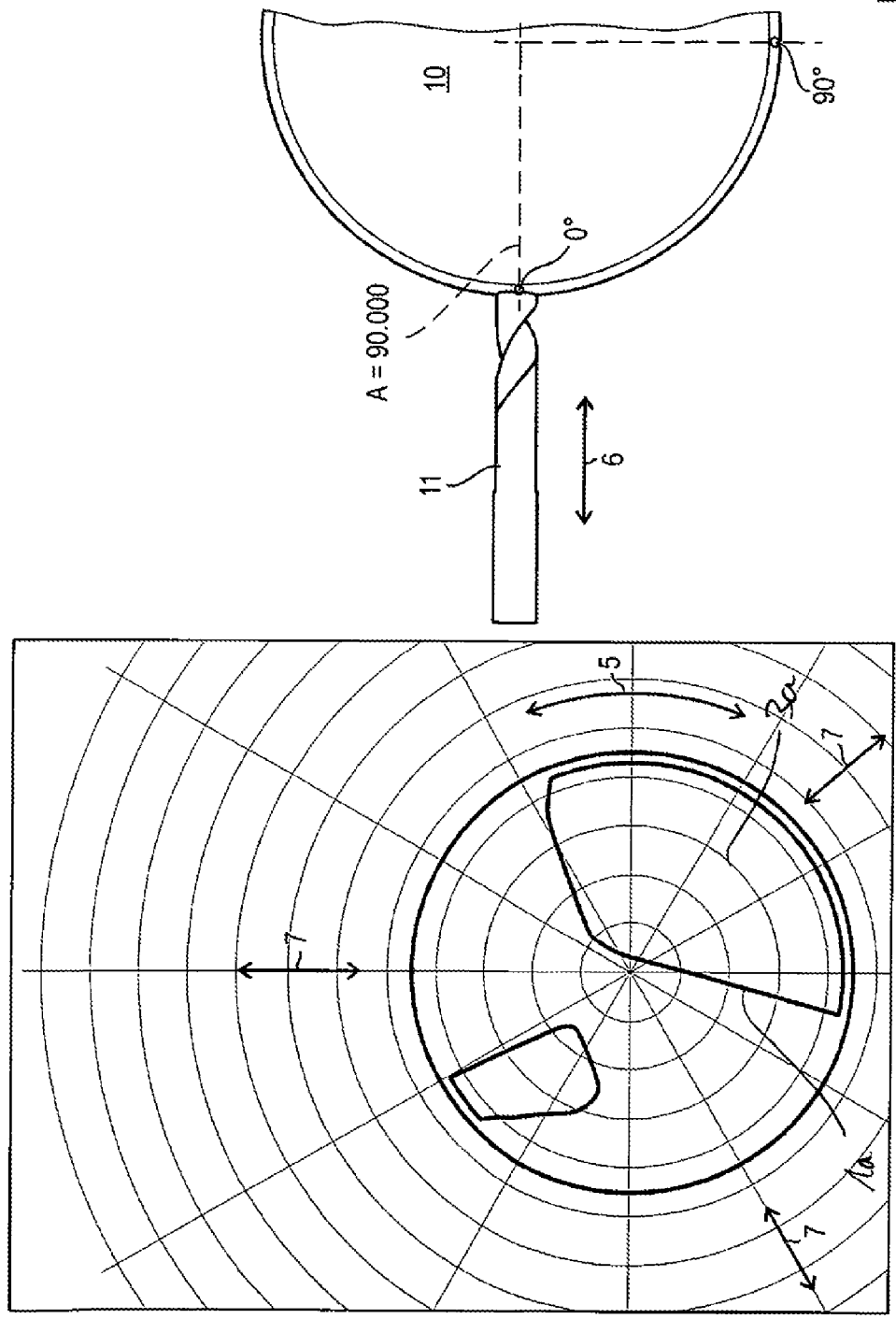
FIG. 14 shows the illustrations according to FIG. 12 but for grinding a thinned region on a tool with a straight major cutting edge.
Figure 15:
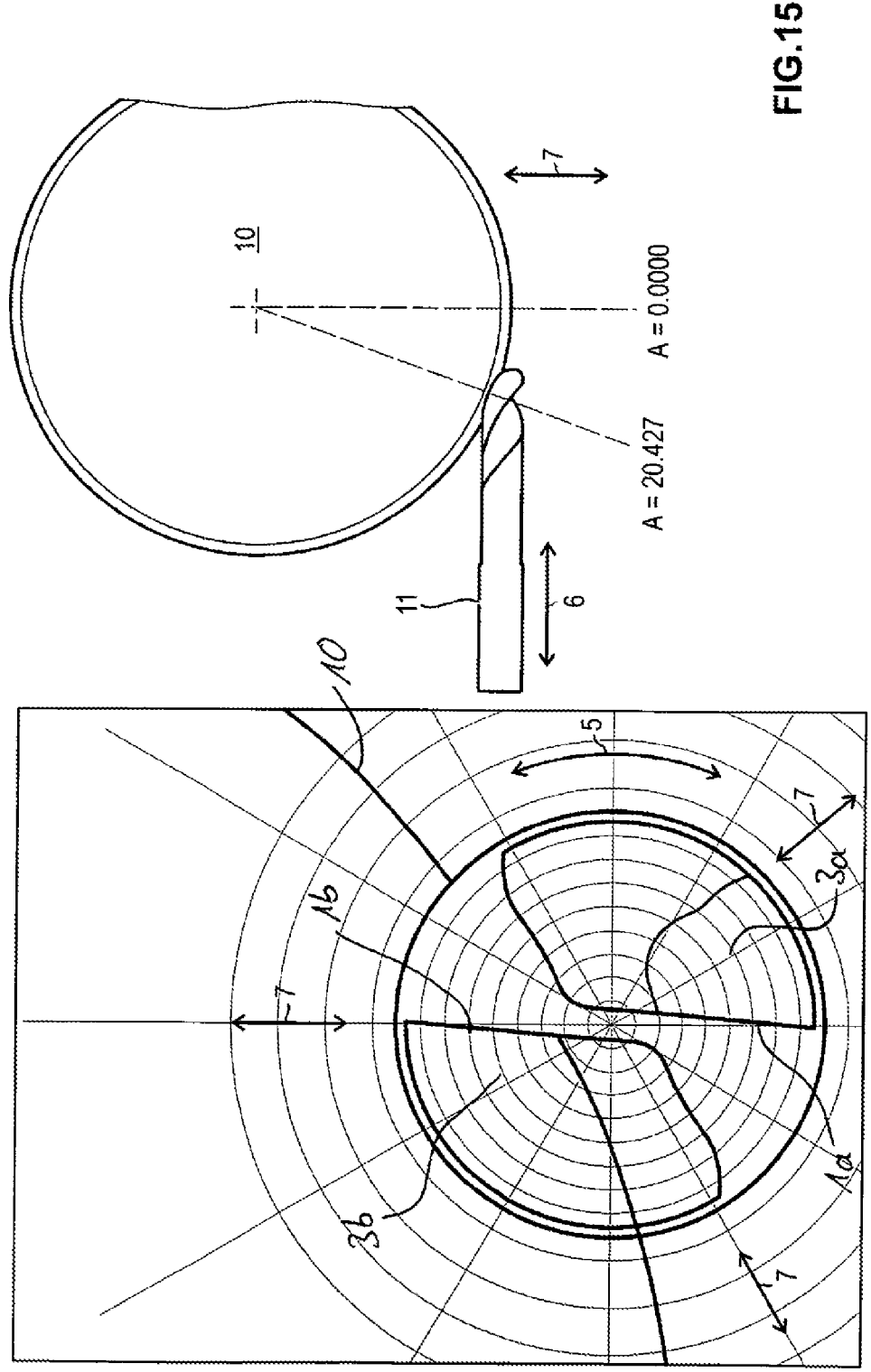
FIG. 15 shows the grinding disk from FIG. 14 at the end of the thinning operation.

Finally, FIG. 12 to FIG. 15 show by way of example the progress of the process according to the invention for producing the drilling tool according to the invention. At the beginning of the production process, the rotating grinding disk 10 feeds into the drill blank 11 from the drill point. Initially, the grinding disk 10 performs a grinding movement in a radial direction 7 of the drill blank 11 in order to grind the thinned region in the region of the major cutting edge. For continuous grinding of the chip flutes 3a, 3b, the grinding disk 10 then moves along the drill blank 11 in the longitudinal direction 6 of the drilling tool. For this purpose, the drill blank 11 is moved along the circumference of the grinding disk in this embodiment, or changes its angular position relative to the grinding disk. In the first example, shown in FIGS. 12 and 13, from the angular position of the grinding disk A=36.918 to the angular position A=20.632. The angular position of the drill blank 11 therefore varies, i.e. the tilt of the center line thereof relative to the radial of the grinding disk 10 varies (when considered in the plane of the drawing). In the second embodiment, which is shown in FIGS. 14 and 15, the center line is in alignment with the radial of the grinding disk 10 at the beginning of the process, in contrast to the preceding example.

If—as in the illustrative embodiment—a helical chip flute 3a, 3b is to be ground, the drill blank 11 rotates in the direction of rotation 5 during the grinding movement of the grinding disk 10.

During the grinding of a curved major cutting edge 1a, 1b, as shown in FIG. 12 and FIG. 13, the point of disk engagement changes, beginning from the drill tip to a length in the longitudinal direction of the drilling tool which corresponds to 3 times the outside circumference diameter D1. The change in the point of disk engagement changes in a range of from 0° to 120°, based on the central longitudinal axis of the drilling tool 11, relative to the center of the grinding disk 10.

FIG. 14 and FIG. 15, in contrast, show the case of production of a straight major cutting edge 1a and 1b.

The invention claimed is:

1. A drilling tool comprising:
   at least two chip flutes defining a core diameter therebetween; and
   a chisel edge with a thinned region disposed on either side thereof defining a thinned core diameter less than the core diameter; and
   a pair of opposing major flanks disposed on opposite sides of the chisel edge,
   wherein the thinned region:
      comprises a portion of each of the at least two chip flutes and forms an end of each of the at least two chip flutes in the region of the chisel edge, and
      merges continuously, without any discontinuities, without any kinks, and without any ridges, into a remainder of each of the chip flutes in such a way that the thinned region forms the end of the respective chip flute in the region of the chisel edge,
   wherein each of the chip flutes:
      extends continuously, without any discontinuities, without any kinks, and without any ridges, to each of: the chisel edge, a respective one of the major cutting edges, and a respective one of the major flanks; and
      is fully concave toward a central axis of the drilling tool, when viewed in transverse cross-section at one or more axial points along the chip flute;
   wherein the tool comprises a core diameter that is reduced steadily, from a normal core diameter to a reduced core diameter at the chisel edge by the thinned region;
   the normal core diameter being constant between the thinned region and a region of run-out of the chip flutes.

2. The drilling tool of claim 1 wherein the at least two chip flutes comprise helical chip flutes with a corresponding helical thinned region at the end of the chip flute adjacent to the chisel edge.

3. The drilling tool of claim 1 wherein the thinned region is of helical shape.

4. The drilling tool of claim 1, wherein the reduced core diameter corresponds to 0.01 to 0.2 times an outside diameter of the drilling tool.

5. The drilling tool of claim 1 wherein the thinned region has a longitudinal extent in the longitudinal direction of the drill which corresponds to 0.1 to 1.5 times an outside diameter of the drilling tool.

6. The drilling tool of claim 1 further comprising an arched major cutting edge.

7. The drilling tool of claim 6 wherein a protective chamfer is provided at an outer end of each major cutting edge.

8. The drilling tool of claim 1 further comprising:
a step formed between each chip flute and a respective one of the major flanks.

9. The drilling tool of claim 1 wherein one of the chip flutes and a corresponding thinned region are formed in a single common grinding operation.

10. The drilling tool of claim 1, wherein each of the chip flutes is fully concave toward a central axis of the drilling tool, when viewed in transverse cross-section at least at five different axial points along the chip flute.

11. The drilling tool of claim 1, wherein each of the chip flutes extends to a first defining axial edge which, when viewed in transverse cross-section, is disposed adjacent an outer circumference of the drilling tool.

12. The drilling tool of claim 11, comprising:
a protective chamfer extending helically in a generally axial direction at an outer circumference of the drilling tool;
wherein the defining axial edge of at least one of the chip flutes comprises an edge of the protective chamfer.

13. The drilling tool of claim 11, wherein each of the chip flutes extends to a second defining axial edge which, when viewed in transverse cross-section, is disposed adjacent an outer circumference of the drilling tool.

14. The drilling tool of claim 1, wherein each of the chip flutes is formed in a single grinding pass in an axial direction of the drilling tool.

* * * * *